UNITED STATES PATENT OFFICE.

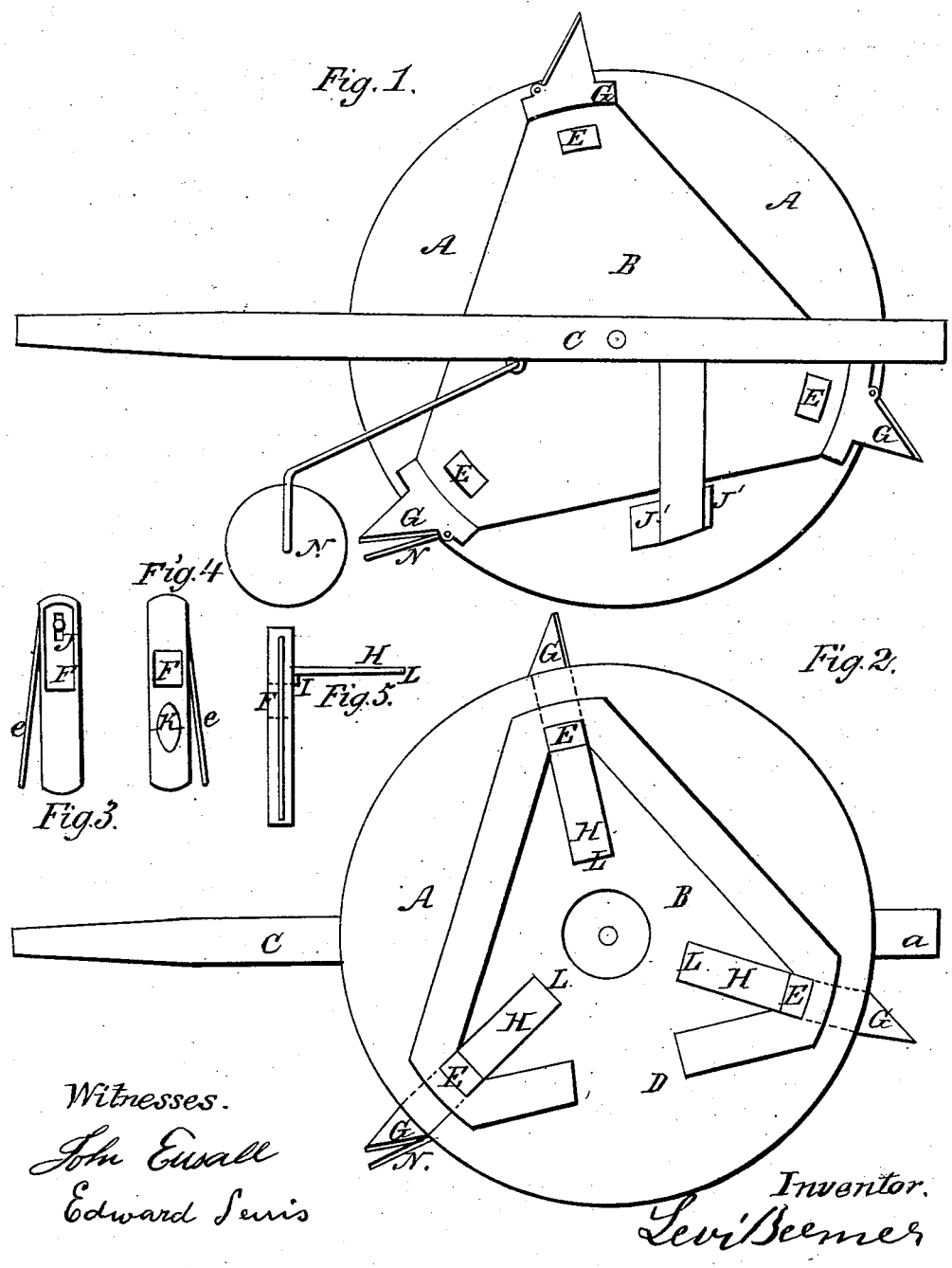

LEVI BEEMER, OF LIBERTYVILLE, NEW JERSEY.

IMPROVEMENT IN SEED-PLANTERS.

Specification forming part of Letters Patent No. 16,522, dated February 3, 1857.

*To all whom it may concern:*

Be it known that I, LEVI BEEMER, of Libertyville, in the county of Sussex and State of New Jersey, have invented a new and useful Improvement in Seed-Planters, of which the following description, illustrated by the accompanying drawings and references, is sufficiently clear and comprehensive to enable persons of competent skill to make and use my invention.

The nature of my improvement relates to the mode of constructing the seeding apparatus, whereby the wheel becomes a receptacle for the seed, and upon revolving changes the position of the same, so as to prepare the seeds for deposit at the point desired, and also in the arrangement for discharging the seeds from their receptacle in the wheel and depositing them in the ground, providing it with yielding springs, which aid in separating the seeds, as more fully set forth in my subjoined specification, and in the mode of giving motion to the seed-droppers.

Figure 1 is a side elevation of my improved planter. Fig. 2 is a similar view with one thill and a side plate removed. Fig. 3 is a view of one side, and Fig. 4 of the opposite side, of the slide which opens the seed-receptacles; and Fig. 5 is a side view of the same with the compensating-spring beneath the slide-key in conjunction with it located in its proper position.

A is a wheel having rectangular seed-receptacles B upon either side, all of which, with the dropping apparatus, are hung in the frame c, which terminates in two shafts or handles, this being designed more particularly for what is termed "hand-planting." The receptacle for the seed is represented as open in Fig. 2, D being the aperture through which the corn is inserted. The openings for the discharge of the seed into the spade-shaped depositing-cups G G, &c., are made in the periphery of the wheel at each corner of the rectangular receptacles for seeds.

E E are measuring slide-keys, having openings within them for the reception of the corn, and through which it is deposited into the depositing-cups G G.

No brushes or any of the ordinary fixtures are used for separating the corn within the cup; but instead thereof I use a spring, H, having an angular head, I, Fig. 5, which slides over the cups F in each of the measuring-keys, but yields whenever they catch a kernel of corn, as in some cases they will, so as to permit the slide of the keys laterally from side to side of the wheel by the action of the cams J' J', one upon each side of the wheel, upon the bars c, designed especially to operate these seed-dropping keys, as represented. A small spring, e, upon the side of the keys, keeps them from sliding when the machine is not in motion.

The large seed-reservoirs B, upon the sides of the wheel of the corn-planter, are intended, one only for dropping and planting corn and other similar seeds, as above stated, and the other, upon the opposite side of the wheel, is intended for planting pumpkin-seeds and other flat seeds of like form; and a second opening, K, in some of the measuring slide-keys, as represented at Fig. 4, is for the purpose of admitting the pumpkin or other flat seeds into the depositing spade-cups with the corn. The peculiar construction of the yielding spring-separators H is shown in Figs. 2 and 5, it being made fast to the side of the wheel at the end L, Fig. 2.

J is a gage, attached to the slide E, to regulate the admission of seed to the cups F.

The wheel, being operated by the hand and handles after the form of a wheelbarrow, the measuring-keys receive their lateral motion from the cams J' at the time the spade-shaped depositing seed-cups G G enter the ground, and as cups leave the ground they will be opened by the action of the earth upon the hinged lid N, and thus the corn or other seed is deposited. The wheel is to be about three feet in diameter, and the corners of the triangular receptacle B a sufficient distance apart for the required distance between hills. The roller M is for the purpose of pressing the earth after the planting is performed.

I claim—

A combination of triangular seed-boxes located upon the side of the drive-wheel, as specified, with the measuring-keys E E E, operated by the cams J' J', to admit the seed into the depositing-cups G G G.

LEVI BEEMER.

Witnesses:
JOHN EDSALL,
EDWARD LEWIS.